June 21, 1966 D. E. KOTAS 3,257,567
OSCILLOSCOPE SWEEP CIRCUIT
Filed Oct. 12, 1962
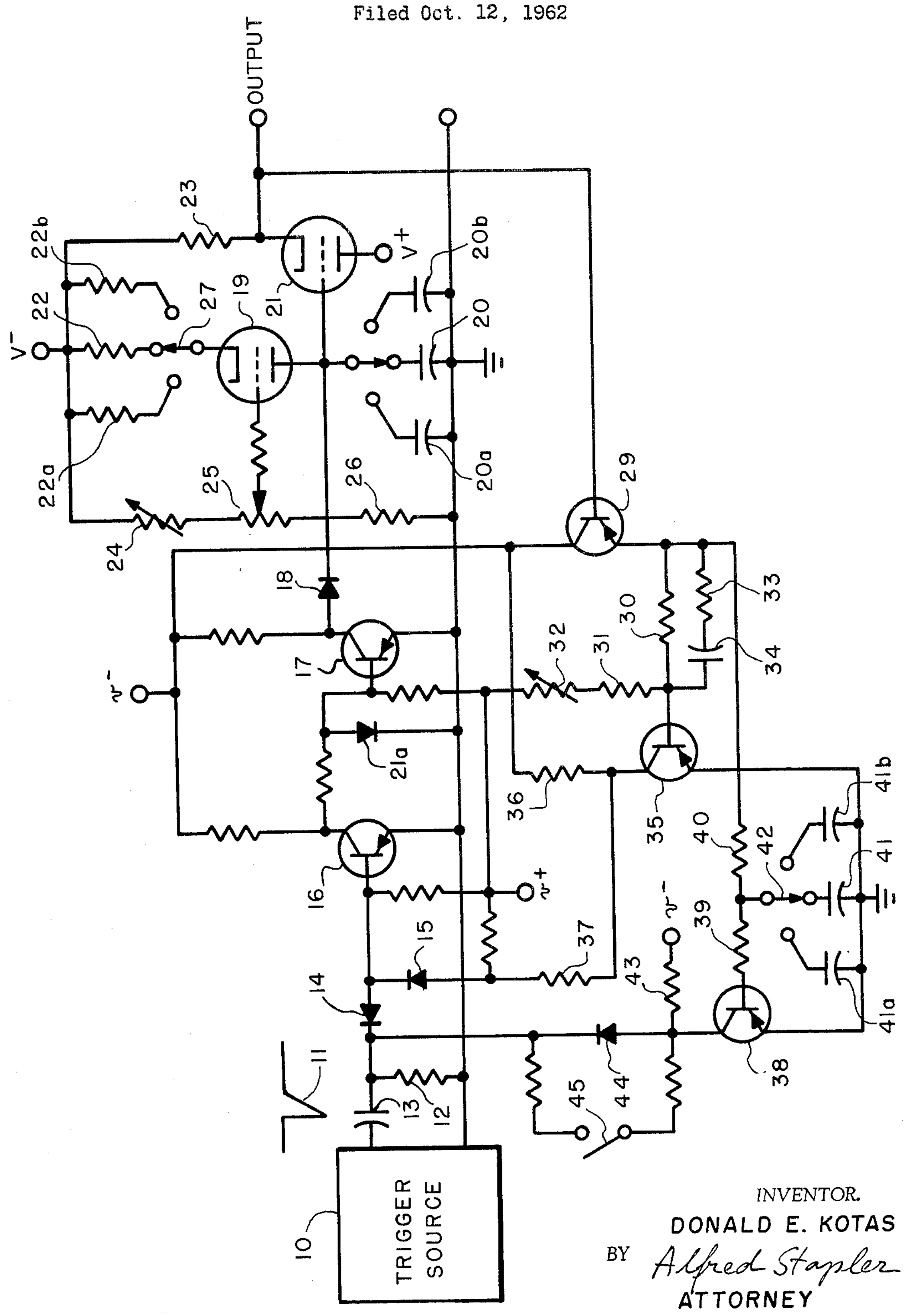
INVENTOR.
DONALD E. KOTAS
BY *Alfred Stapler*
ATTORNEY 3,257,567

OSCILLOSCOPE SWEEP CIRCUIT

Donald E. Kotas, Roslyn, Pa., assignor to General Atronics Corporation, Wyndmoor, Pa., a corporation of Pennsylvania Filed Oct. 12, 1962, Ser. No. 230,221
6 Claims. (Cl. 307—88.5)

This invention relates to sweep circuits for cathode ray tube oscilloscopes.

In such circuits it is desired to provide for production of sawtooth sweep voltage waveforms which are as linear as practical during their forward scan portions, as well as for the rejection of unwanted sweep triggering signals, all with the smallest possible number of circuit components consistent with satisfactory operation.

Prior sweep circuits have left much to be desired in one or more of the above-mentioned respects.

It is accordingly a prime object of the invention to provide a new sweep circuit which is free from one or more of the shortcomings of prior sweep circuits.

It is another object to provide a sweep circuit productive of a sweep waveform having a high degree of linearity, particularly during its forward scan portion.

It is still another object to provide a sweep circuit which reliably rejects undesired sweep trigger signals.

It is yet another object to provide a sweep circuit in which the number of components is kept at a minimum consistent with obtaining the desired operating characteristics.

These objects and others which will appear are achieved by means of a circuit which responds to the application of a trigger signal to change the conductivity state of a transistor so as to initiate charging of a capacitor from a constant current source. In response to the accumulation of a predetermined charge in the capacitor, the transistor is changed back to its pre-trigger conductivity state, the charging terminates and the capacitor is rapidly discharged. Means are also provided for preventing untimely initiation of a succeeding sweep before the sweep retrace has been completed.

For further details, reference may be had to the accompanying single figure of drawing which illustrates a circuit constituting a preferred embodiment of the invention.

In that figure, rectangle 10 designates a source of sweep trigger signal. This signal may, for example, be a negative-going spike signal such as illustrated at 11. Source 10 may take any one of numerous conventional forms and need therefore not be described in detail.

The trigger signal from source 10 is supplied via R-C coupling network 12, 13 to diode 14. Another diode 15 is connected in series with diode 14, and their junction is connected to the base of a bistable transistor 16 which may, for example, be of the type designated as 2N1213. This type of transistor is characterized in that the application of a negative-going waveform to its base renders it conductive, in which state it remains until a positive-going pulse applied to the base renders it non-conductive. Intermediate pulses of negative polarity have no effect. On the other hand, positive pulses have no further effect once the transistor is non-conductive.

The collector of transistor 16 is connected to the base of transistor 17 and the collector of the latter is connected via diode 18 to the junction of the connections leading to the anode of a triode vacuum tube 19, a capacitor 20 and the grid of another triode vacuum tube 21.

It is preferable although not essential, to connect a clamping diode 21*a* between the base of transistor 17 and ground with such polarity as to prevent the potential at said base from rising appreciably above ground.

The cathode of tubes 19 and 21 are connected through their respective cathode load resistors 22 and 23 to a source of negative unidirectional potential $V^-$ and the anode of tube 21 is connected to a suitable source of anode potential $V^+$. A series network of three resistors 24, 25 and 26 is connected across the series combination of resistor 22, tube 21 and capacitor 20 Resistor 26 is fixed, resistor 25 is a potentiometer whose variable arm is connected to the grid of tube 19, and resistor 24 is a variable resistor.

For purposes described more fully hereinafter, switches 27 and 28 are connected in series with the cathode and anode, respectively, of tube 19. These switches are ganged together and permit simultaneous connection into the cathode and anode circuits respectively of tube 19 of resistors and capacitors having different values. Typical resistors and capacitors which may thus be substituted for those shown at 22 and 20 are illustated in broken lines at 22*a*, 22*b*, and 20*a*, 20*b*, respectively.

The cathode of tube 21 is connected to the base of transistor 29. The collector of transistor 29 is connected to a source of negative unidirectional potential $v^-$, while its emitter is connected via a network of series resistors 30, 31 and 32 to a source of positive unidirectional potential $v^+$. Resistor 32 is variable and resistor 30 is shunted by a series R-C network 33, 34.

The junction of resistors 30 and 31 is connected to the base of a transistor 35 whose emitter is grounded and whose collector is returned to source $v^-$ via a load resistor 36. The collector of transistor 35 is also connected, via a resistor 37, to that electrode of diode 15 which is not directly connected to diode 14.

The emitter of transistor 29 is also connected to the base of a transistor 38, via a low-pass filter consisting of two series resistors 39, 40 and a capacitor 41 connected between the junction of these resistors and ground. Connected in series with capacitor 41 is a switch 42, ganged with both of switches 27 and 28, by means of which other capacitors, such as those shown in broken lines at 41*a* and 41*b*, may be substituted for capacitor 41 in the circuit.

Transistor 38 has its emitter grounded and its collector returned to source $v^-$ via a load resistor 43.

A diode 44 is connected between the collector of transistor 38 and diode 14 and a switch 45 shunts this diode 44.

The circuit described above operates as follows.

With the grid of vacuum tube 19 established, through adjustment of potentiometer 24 and 25, at a substantially more positive potential than that of source $V^-$, this tube becomes essentially a constant current source, whose plate current is constant, depending only on the resistance in its cathode circuit. Whenever transistor 17 is conducting, this constant current flows between tube 19 and ground through diode 18 and transistor 17. On the other hand, when transistor 17 is not conducting, this same current charges the capacitor connected in the anode circuit of tube 19 as explained more fully hereinafter.

The conductivity state of transistor 17 is controlled by the trigger signals from source 10. A negative trigger signal, such as that shown at 11 in the drawings passes through diode 14 and reaches the base of transistor 16. This transistor, which may be assumed to have been non-conducting up to this moment, becomes conductive upon application of this negative pulse and remains so until further notice. The collector of transistor 16 thereby becomes established at subsequently ground potential and this in turn removes the negative bias previously present at the base of transistor 17, causing a corresponding rise in the potential at that base. This renders transistor 17 non-conducting. The potential at the collector of transistor 17 thereupon begins to change from a value near ground to a value near the negative potential supplied by source $v^-$. This negative-going change blocks diode 18 and interrupts the tube anode current flowing through that diode. To keep diode 18 blocked while the anode current of tube 19 charges the capacitor 20 the rise time of the collector of transistor 17 should be faster than the fastest sweep speed desired. This can readily be accomplished by appropriate selection of this transistor and of the diode 18. Diode 18 is preferably a high speed silicon diode, such as that bearing the type designation 1N914. Being a silicon diode, it has low leakage at low currents and slow sweep speeds, while its fast switching speed characteristics permit it to operate rapidly enough to be effective at high sweep speeds.

The accumulation of negative charge on the ungrounded plate of capacitor 20 causes the grid of tube 21 to become correspondingly more negative. This negative-going potential is reproduced at the cathode of tube 21, which is directly connected to the output terminal of the circuit. This negative-going variation constitutes the forward scan portion of the sweep waveform. Tube 21 is connected in a cathode follower configuration in order to provide a high impedance across the capacitor 20. In this way a low capacitor charging current, such as occurs at low sweep speeds, is not too heavily loaded down by the output stage constituted by tube 21 and its associated components.

Transistor 29, being connected in an emitter follower configuration, reproduces at its emitter the signal variations appearing at the cathode of tube 21. The series resistors coupling the emitter of transistor 29 to the source of positive voltage $v^+$ are so proportioned that, when the negative-going sweep signal developed at the cathode of tube 21 and translated via the emitter follower 29 reaches a sufficiently negative value—corresponding to the end of the desired sweep waveform—the positive bias from source $v^+$ which tends to keep transistor 35 non-conducting will just be overcome by the signal from the emitter follower 29 and transistor 35 will therefore become conducting.

The collector of transistor 35 then rises from the potential approximating that of the source $v^-$, which it has while the transistor is non-conducting, to a potential substantially equal to ground potential, and the positive-going waveform which is thus produced at its collector is transferred via resistor 37 to diode 15 and via diode 15 to the base of transistor 16. This positive-going waveform switches transistor 16 from the conducting state (into which it had previously been placed by the trigger 11) back into its non-conducting state. This in turn drives the collector of transistor 16 negative, the base of transistor 17 follows, transistor 17 becomes conductive, and diode 18 likewise becomes conductive. The anode current of tube 19 thereupon becomes diverted from capacitor 20 and the capacitor itself also discharges through the series combination of transistor 17 and diode 18. The resulting rise in positive potential at the grid of tube 21 is reproduced at its cathode, and this variation constitutes the retrace portion of the sweep waveform.

The voltage level at which transistor 35 becomes conducting, as explained above, can be varied by means of variable resistor 32 which controls the value of the positive bias that must be overcome by the sweep waveform to terminate the same and initiate the retrace. By controlling this level resistor 32 controls in effect the physical length of the path traced out by the cathode ray beam of the oscilloscope during each sweep.

Since the discharging of capacitor 20 through transistor 17 and diode 18 occurs very rapidly, due to the low impedance of these two devices when in their conducting states, the retrace portion of the sweep waveform is much steeper than the forward scan portion of the same waveform. This is as it should be, since the retrace is preferably much shorter than the forward scan. The steepness, and with it the duration of the forward scan portion of the waveform can be established at different values by simply switching into the cathode and anode circuits of vacuum tube 19 different values of resistors and capacitors, respectively, by means of switches 27 and 28. An additional vernier adjustment can be made at each switch setting by means of potentiometer 25. This changes the potential of the grid of tube 19 from its calibrated voltage. This action changes the charging current from its calibrated value for vernier action. Variable resistor 24 is an adjustment to set the charging current at its calibrated value.

Transistor 38 will remain non-conducting as long as the sweep waveform developed at the cathode of tube 21, and the corresponding waveform developed at the emitter of transistor 29, remain above ground potential. On the other hand, transistor 38 will become conductive once these waveforms become more negative than ground potential. The circuit parameters are preferably chosen so that this latter event takes place once in each sweep, as for example, by setting the circuit up to produce a sweep waveform whose forward scan portion starts at approximately 5 volts above ground potential and ends at about 15 volts below ground potential. When this waveform crosses ground potential, transistor 38 becomes conductive and therefore establishes its collector at approximately ground potential. This overcomes the negative bias otherwise applied to diode 44 from the source of negative potential $v^-$ via resistor 43. This diode therefore also becomes conductive and short-circuits to ground, via transistor 38, any negative trigger pulses thereafter emanating from source 10.

It is desired to prevent triggering of a new sweep waveform by pulses from source 10 not only during the forward scan portion of the waveform but also during the entire retrace portion. Yet, if no further precautions were taken, the transistor 38 would again be cut off during the retrace portion as soon as the sweep waveform crosses the ground potential level. This happens before the end of retrace, which is not reached until the sweep waveform again reaches a level of 5 volts above ground. During this final portion of the retrace waveform (between ground and plus 5 volts) trigger pulses from source 10 could therefore trigger the sweep circuit prematurely. The low pass filter composed of resistors 39, 40 and capacitor 41 prevents this by operating, during the steep retrace portion of the waveform, to reduce the rate at which the potential at the base of transistor 38 rises toward ground potential. In this way the time at which transistor 38 emerges from its conductive, false-trigger-preventive state is delayed until the end of the retrace portion of the sweep waveform. For best results, the above-mentioned filter should be capable of providing different amounts of time delay depending upon the desired sweep speed. For this reason the same switching action which changes the sweep speed by switching different resistors and capacitors into circuit with tube 19, is also used to connect different capacitors (e.g. capacitor 41*a* or 41*b*) into circuit with the filter, thereby varying the response speed of this false-trigger-preventing circuit.

Switch 45 is placed in its open position when the circuit as a whole is being triggered by pulses from source 10. On the other hand, if there is no trigger signal from circuit 10, this switch 45 may be closed, thereby establishing a mode of operation for the circuit in which a negative going potential derived from the sweep waveform itself is applied to diode 14, thus makin the circuit self-triggering.

It will be understood that this circuit is susceptible of numerous modifications without departing from the inventive concept. For example, the circuit may be made to produce sweep waveforms of virtually any desired amplitude and speed merely by adjusting the circuit parameters appropriately in a manner which would be apparent to those skilled in the art.

In view of this, I desire the scope of the invention to be limited only by the appended claims.

I claim:

1. An oscilloscope sweep circuit comprising: vacuum tube means productive of a substantially constant current;
   bi-stable transistor means having at least a base and responsive to the application of a trigger signal of one polarity to become conducting and of a trigger signal of the opposite polarity to become non-conducting;
   means responsive to conduction of said transistor means to provide for said current a high impedance path to a point of fixed potential and to non-conduction of said transistor means to provide a low-impedance path to said point;
   charge storage means shunting said path providing means;
   and a pair of diodes connected to the base of said transistor means so as to permit, respectively, flow of currents of opposite polarities to said base.

2. An oscilloscope sweep circuit comprising: vacuum tube means productive of a substantially constant current;
   bi-stable transistor means having at least a collector and responsive to the application of a trigger signal of one polarity to become conducting and to a trigger signal of the opposite polarity to become non-conducting;
   means responsive to conduction of said transistor means to provide for said current a high impedance path to a point of fixed potential and to non-conduction of said transistor means to provide a low impedance path to said point, said path providing means comprising the series combination of a transistor having a base supplied with a potential derived from the collector potential of said bi-stable transistor means and diode means connected to permit flow of said current;
   and charge storage means shunting said path providing means.

3. An oscilloscope sweep circuit comprising:
   a vacuum tube productive of a substantially constant current;
   bi-stable transistor means having at least a base circuit and responsive to the application of a trigger signal of one polarity to become conducting and to a signal of the opposite polarity to become non-conducting;
   means responsive to conduction of said transistor means to provide for said current a high impedance path to a point of fixed potential and to non-conduction of said transistor means to provide a low-impedance path to said point;
   charge storage means shunting said path providing means;
   means responsive to the accumulation of a predetermined charge on said charge storage means to switch said transistor means from its conducting to its non-conducting state;
   and a cathode follower vacuum tube means responsive to said accumulation to establish in shunt with the base circuit of said bi-stable transistor means a circuit of low impedance for said trigger signal.

4. The circuit of claim 3 further characterized in that said low impedance circuit comprises a series combination of a diode and a transistor, and means for rendering said transistor conductive in response to accumulation in said charge storage means of a charge less than said predetermined charge.

5. The circuit of claim 4 further characterized in that said means for rendering said transistor conductive comprises a low-pass filter coupled intermediate said charge storage means and said transistor.

6. The circuit of claim 5 further comprising switch means for establishing a bidirectionally conductive path shunting said diode.

References Cited by the Examiner

UNITED STATES PATENTS

| | | | |
|---|---|---|---|
| 2,562,188 | 7/1951 | Hance | 328—185 |
| 2,562,295 | 7/1951 | Chance | 328—185 |
| 2,824,962 | 2/1958 | Wise | 328—185 X |
| 2,891,173 | 6/1959 | Helbig | 307—88.5 |
| 2,957,090 | 10/1960 | Hamilton | 307—88.5 |
| 3,011,068 | 11/1961 | McVey | 307—88.5 |
| 3,049,625 | 8/1962 | Brockman | 307—88.5 |
| 3,138,764 | 6/1964 | Dalton et al. | 328—182 |

JOHN W. HUCKERT, *Primary Examiner.*

S. D. MILLER, *Assistant Examiner.*